United States Patent
Komiyama (10) Patent No.: US 9,643,433 B2
(45) Date of Patent: May 9, 2017

(54) MEDIA PROCESSING DEVICE AND METHOD OF CONTROLLING A MEDIA PROCESSING DEVICE

(71) Applicant: Seiko Epson Corporation, Tokyo (JP)

(72) Inventor: Takahisa Komiyama, Kitasakugun Tateshinamachi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/981,456

(22) Filed: Dec. 28, 2015

(65) Prior Publication Data

US 2016/0107462 A1   Apr. 21, 2016

Related U.S. Application Data

(63) Continuation of application No. 13/612,662, filed on Sep. 12, 2012, now abandoned.

(30) Foreign Application Priority Data

Sep. 28, 2011   (JP) ................................ 2011-212332

(51) Int. Cl.
  *G06F 3/12*   (2006.01)
  *B41J 13/00*   (2006.01)
  (Continued)

(52) U.S. Cl.
  CPC ........... *B41J 13/0009* (2013.01); *B41J 3/445* (2013.01); *G06K 1/125* (2013.01); *G06Q 20/042* (2013.01);
  (Continued)

(58) Field of Classification Search
  USPC ....................................................... 358/1.13
  See application file for complete search history.

(56) References Cited

U.S. PATENT DOCUMENTS 6,144,459 A    11/2000  Satou
6,181,440 B1    1/2001  Masuda
(Continued)

FOREIGN PATENT DOCUMENTS

JP    2003-248398 A    9/2003
JP    2005-094121 A    4/2005

OTHER PUBLICATIONS

Extended European Search Report, dated Feb. 20, 2013, of corresponding EP Application No. 12184778.4, 5 pages.
(Continued)

*Primary Examiner* — Marivelisse Santiago Cordero
*Assistant Examiner* — Kevin Ky
(74) *Attorney, Agent, or Firm* — Kilpatrick Townsend & Stockton LLP (57) ABSTRACT

Maintenance requirements are reduced by using only a subset of the functions of a media processing device having plural function units for processing processed media. When a control unit of the media processing device receives a command from a host computer to disable a function of an inkjet printer unit disposed to a conveyance path for the processed media or to disable a function of a contact image sensor unit disposed to the conveyance path, a function-disabled mode is entered that disables the specified function. While in the function-disabled mode, detected operating errors related to the disabled function are not reported to the host computer.

13 Claims, 7 Drawing Sheets

(51) Int. Cl.
*G06Q 20/04* (2012.01)
*H04N 1/32* (2006.01)
*B41J 3/44* (2006.01)
*G06K 1/12* (2006.01)
*G07D 7/04* (2016.01)
*H04N 1/00* (2006.01)

(52) U.S. Cl.
CPC ........... *G07D 7/04* (2013.01); *H04N 1/00925* (2013.01); *H04N 1/32609* (2013.01); *H04N 1/32673* (2013.01)

(56) References Cited

U.S. PATENT DOCUMENTS

| | | | |
|---|---|---|---|
| 2005/0195231 A1* | 9/2005 | Kasamatsu | B41J 2/17566 347/14 |
| 2007/0058851 A1* | 3/2007 | Quine | G06Q 20/042 382/137 |
| 2007/0146823 A1 | 6/2007 | Borchers et al. | |
| 2009/0225355 A1 | 9/2009 | Kazume et al. | |
| 2010/0058123 A1* | 3/2010 | Yamashirodani | G03G 15/5079 714/57 |
| 2010/0177351 A1* | 7/2010 | Asai | G03G 21/1882 358/1.15 |
| 2010/0198967 A1* | 8/2010 | Takahashi | H04N 1/00344 709/224 |
| 2010/0272452 A1 | 10/2010 | Tukijima | |
| 2011/0013221 A1* | 1/2011 | Kang | G06F 3/1204 358/1.15 |

OTHER PUBLICATIONS

Non-Final Office Action, dated Feb. 25, 2014, of corresponding U.S. Appl. No. 13/612,662, 20 pages.
Final Office Action, dated Jul. 24, 2014, of corresponding U.S. Appl. No. 13/612,662, 20 pages.
Non-Final Office Action, dated Apr. 1, 2015, of corresponding U.S. Appl. No. 13/612,662, 13 pages.
Final Office Action, dated Oct. 5, 2015, of corresponding U.S. Appl. No. 13/612,662, 12 pages.

* cited by examiner

MEDIA PROCESSING DEVICE AND METHOD OF CONTROLLING A MEDIA PROCESSING DEVICE

CROSS-REFERENCES TO RELATED APPLICATIONS

This application is a continuation of U.S. application Ser. No. 13/612,662, filed Sep. 12, 2012, which claims priority to Japanese Application No. 2011-212332, filed Sep. 28, 2011, the entireties of which are incorporated by reference herein.

BACKGROUND

1. Technical Field

The present invention relates to a media processing device and to a method of controlling a media processing device.

2. Related Art

Devices that perform multiple processes, such as printing and scanning images, on media to be processed are described, for example, in Japanese Unexamined Patent Appl. Pub. JP-A-2003-248398 and Japanese Unexamined Patent Appl. Pub. JP-A-2005-94141.

Media processing devices such as these that have multiple functions need to enable use of all functions, and being unable to use any function is treated as a system error. As a result, because use of the media processing device is completely disabled if an operating error occurs in either the print unit or the scanning unit, even functions where an error did not occur cannot be used. This means that even if the user of the media processing device only uses some of the available functions, the functions that are not used must also be maintained in a usable condition and therefore require maintenance.

SUMMARY OF INVENTION

With consideration for the foregoing problem, the present invention enables reducing maintenance needs when using only some of the functions provided by a media processing device having plural function units for processing media.

A media processing device according to one aspect of the invention has a conveyance path that conveys processed media; a print unit that is disposed to the conveyance path and has a function that prints on the processed media; a reading unit that is disposed to the conveyance path and has a function that reads the processed media; and a control unit that, when a command to disable the function of the print unit or the reading unit is received from an external device, enters a function-disabled mode that disables the specified function and, when an error related to the disabled function of the print unit or the reading unit is detected, does not report the error to the external device.

When the media processing device receives a command to disable either the printing function or the reading function, and an error related to the disabled function occurs, the media processing device can continue to be used without resolving the error. As a result, using only some functions of a media processing device with multiple functions is possible, and the burden of maintaining functions that are not used can be reduced.

In a media processing device according to another aspect of the invention, the print unit includes an inkjet recording head that records by ejecting ink stored in an ink storage unit onto the processed media.

By setting the function-disabled mode that disables the printing function when using only the reading (scanning) function and not using the print function of the inkjet recording head, this aspect of the invention does not report errors related to the inkjet recording head or ink supply, and enables using the reading function without performing ink-related maintenance tasks. As a result, the media processing device can reduce the maintenance load, and can suppress needless consumption of ink because ink is not supplied just for maintenance.

In a media processing device according to another aspect of the invention, the control unit does not enter the function-disabled mode when the command to disable the function of the print unit is received after the ink storage unit is enabled to supply ink.

When ink-related maintenance is required by the system design specifications, such as when ink is supplied from the ink storage unit to the path that supplies ink, this aspect of the invention enables the media processing device to enter the function-disabled mode only if maintenance is not required. The burden of maintenance is therefore reduced when using a function other than the printing function, and problems arising from not performing required maintenance after supplying ink is made possible can be prevented.

In an media processing device according to another aspect of the invention, when the command to disable the function of the print unit is received after the ink storage unit is enabled to supply ink, the control unit enters the function-disabled mode and enables executing specific maintenance operations related to the print unit.

When ink-related maintenance is required by the system design specifications, such as when ink is supplied from the ink storage unit to the path that supplies ink, this aspect of the invention enables performing the minimum maintenance required, thereby suppressing ink consumption and preventing problems arising from not performing required maintenance when using functions other than printing.

In a media processing device according to another aspect of the invention, the control unit considers invalid and does not report a subset of errors related to the function disabled in the function-disabled mode, but reports other errors related to the disabled function, to the external device.

The media processing device according to this aspect of the invention disregards some errors detected in the function-disabled mode and enables continued use of only functions that are not disabled, but does not disable all errors and reports some errors to the external device. For example, errors that are related to the disabled function but cannot be left unresolved are reported. As a result, the burden of maintenance can be reduced by disabling some functions while continuing to appropriately report errors that must be addressed to the user.

Another aspect of the invention is a method of controlling a media processing device that includes a print unit disposed to a conveyance path and a reading unit disposed to the conveyance path. The print unit has a function that prints on the processed media. The reading unit has a function that reads the processed media. The control method includes receiving a command from an external device to disable at least one of the function of the print unit or the function of the reading unit. A function-disabled mode is entered when the command to disable the at least one of the function of the print unit or the function of the reading unit is received from the external device. The function-disabled mode disables the specified at least one function. When an error related to the disabled function of the print unit or the reading unit is detected, the error is not reported to the external device.

When the media processing device receives a command to disable either the printing function or the reading function, and an error related to the disabled function occurs, the media processing device can continue to be used without resolving the error. As a result, using only some functions of a media processing device with multiple functions is possible, and the burden of maintaining functions that are not used can be reduced.

Effect of the Invention

The invention enables using only a subset of the functions of a media processing device having plural functions, and can reduce the burden of maintenance related to unused functions.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
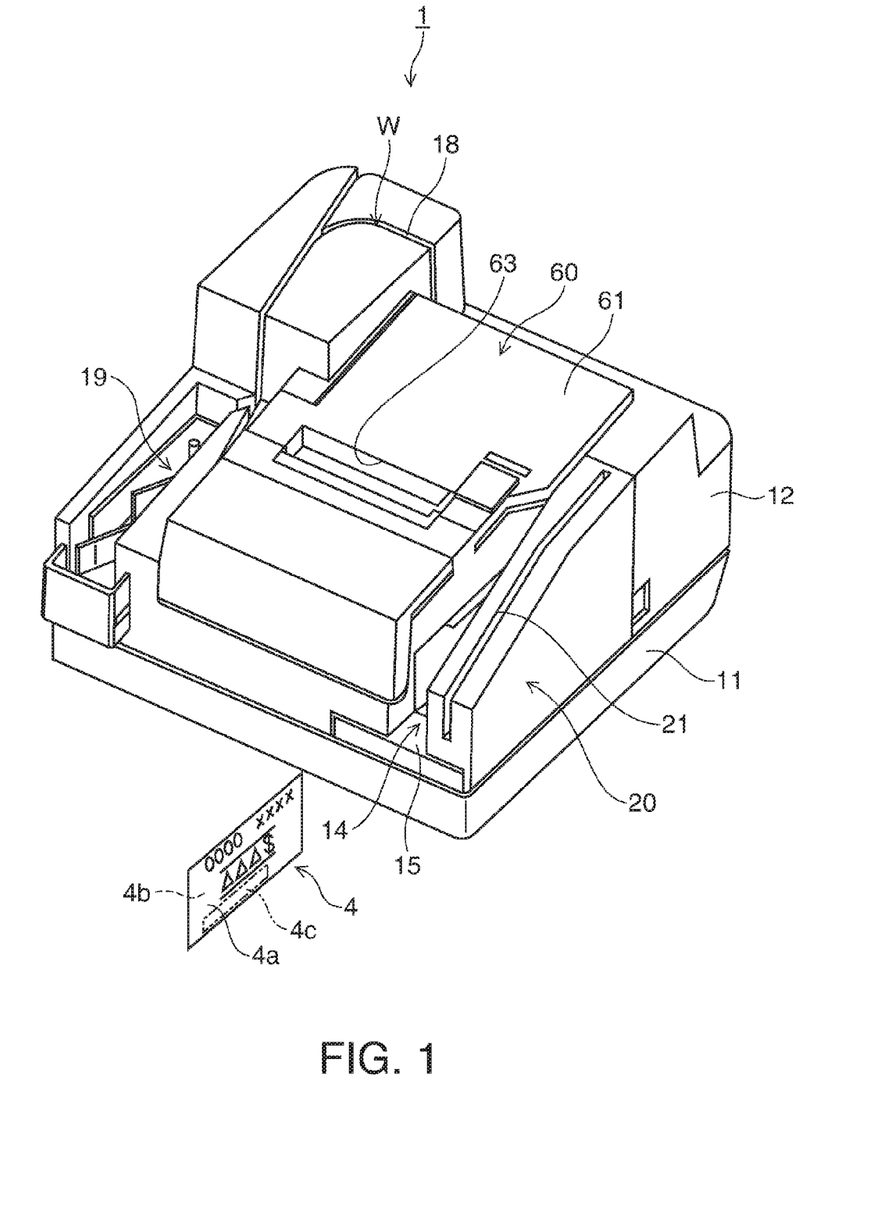
FIG. 1 is an external oblique view of a media processing device according to a preferred embodiment of the invention.

FIG. 1 is an oblique view of a media processing device 1 according to this embodiment of the invention.

The media processing device 1 is a device that can process media such as checks 4 and other forms (referred to herein as "processed media") in multiple ways, including reading magnetic ink characters printed on the processed medium, optically imaging (scanning) both sides of the processed medium, and recording (printing) images including text on the processed medium. The media processing device 1 also functions as a card reader that reads magnetic information recorded on card media such as credit cards, and functions to produce specific types of tickets with an image recorded thereon by recording an image to thermal roll paper and cutting the paper.

This embodiment of the invention describes processing checks 4 as an example of the processed medium. As shown in FIG. 1, a check 4 is a form having a payment amount, payee, serial number, payer signature, and other information printed on a sheet (paper) with a specific colored or patterned background. The payment amount, payee, serial number, payer signature, and other information are printed on the face 4a, and an endorsement area is provided on the back 4b. An endorsement is printed with specific text or an image in the endorsement area by the inkjet head 10 described below. An MICR (magnetic ink character recognition) line 4c is preprinted along the length of the check 4 on the face 4a. The MICR line 4c is a line of magnetic ink characters printed with magnetic ink, and can be read magnetically and optically.

The outside case of the media processing device 1 includes a bottom case 11 that covers the bottom part of the media processing device 1, and a cover 12 that covers the bottom case 11, and the main parts of the media processing device 1 are housed inside this outside case. An entrance 14 for inserting checks 4 is open at the front of the media processing device 1, and a stacker 15 that can hold a stack of plural checks 4 is provided inside the entrance 14. The stacker 15 can be pulled out to the front, and the checks 4 can be loaded into the stacker 15 after adjusting the stacker 15 to the size of the checks 4 to be stored in the stacker 15.

A slot 18 that is substantially U-shaped when seen from above and is used as the conveyance path W of the checks 4 is formed in the cover 12, and the slot 18 ends in an exit pocket 19 at the front of the media processing device 1. Checks 4 stored in the stacker 15 are fed one by one into the media processing device 1 as described below, are processed as they pass through the slot 18, and the processed checks 4 are discharged into the exit pocket 19. Multiple checks 4 can accumulate in the exit pocket 19.

As shown in FIG. 1, a magnetic card reader 20 is disposed beside the stacker 15. The magnetic card reader 20 includes a card slot 21 formed in the cover 12, and an MCR (magnetic card reader) head 22 (FIG. 3) disposed facing the card slot 21, and reads information magnetically recorded on cards passing through the card slot 21 with the MCR head 22.

Figure 2:
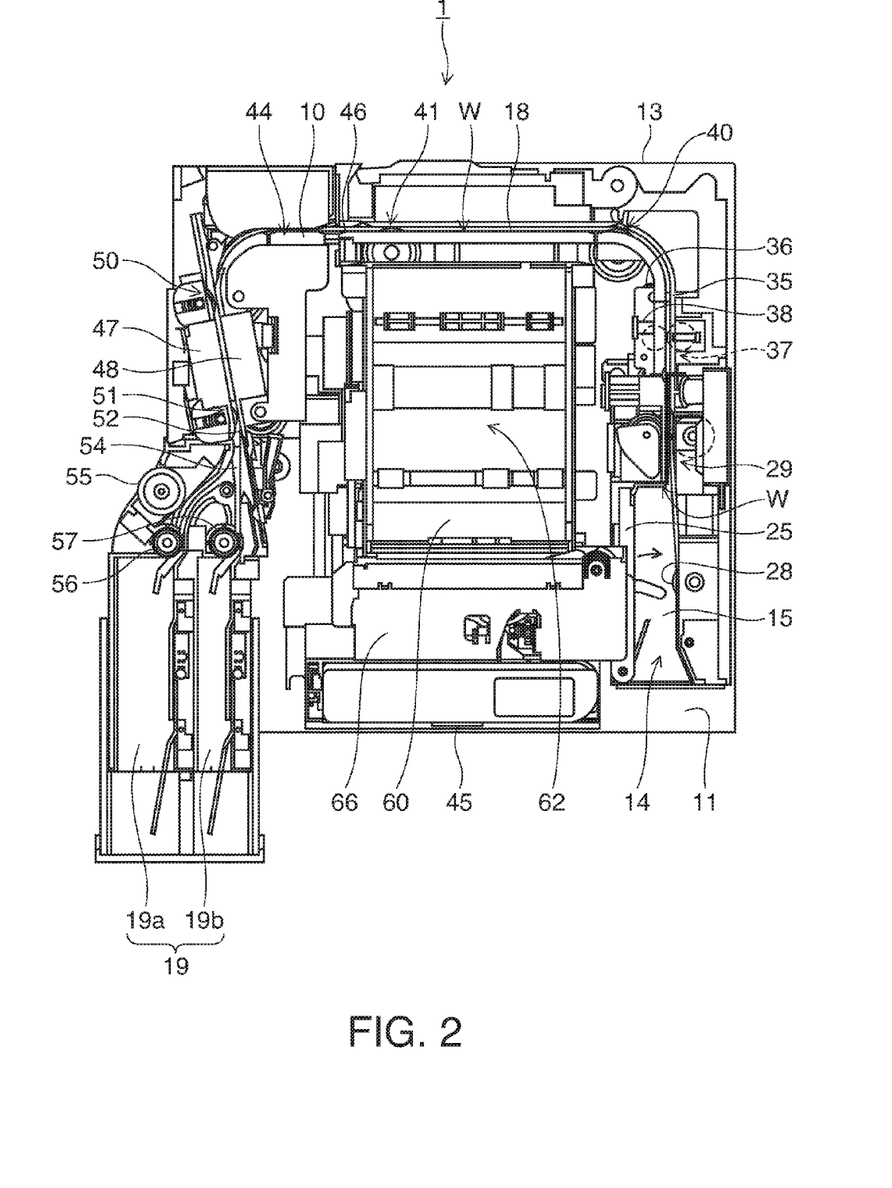
FIG. 2 is a plan view of the media processing device.

FIG. 2 is a plan view showing the configuration of the main unit of the media processing device 1 housed the outside case. As shown in FIG. 2, a hopper 25 is disposed on one side of the stacker 15. The hopper 25 can pivot in the direction of the arrow by means of a hopper drive motor 26 (FIG. 3), and pushes the checks 4 in the stacker 15 to the other side.

A pickup roller 28 driven by an ASF (automatic sheet feeder) motor 27 (FIG. 3) described below is disposed on the other side of the stacker 15, and when the hopper 25 rotates toward the pickup roller 28, one check 4 in the stacker 15 is urged by the rotating hopper 25 to the pickup roller 28, contacts the roller, and is fed into the conveyance path W by rotation of the pickup roller 28.

An ASF roller set 29 composed of a pair of rollers is disposed downstream from the stacker 15. The two rollers of the ASF roller set 29 are disposed on opposite sides of the conveyance path W, one roller is driven by the ASF motor 27, and the other roller is a follower roller. The check 4 in contact with the pickup roller 28 is nipped by the ASF roller set 29, and conveyed downstream through the slot 18.

An ASF paper detector 31 (FIG. 3) is disposed to a specific position in the stacker 15. The ASF paper detector 31 is a transmissive photosensor in this embodiment, and detects if a check 4 is in the stacker 15.

A hopper position detector 32 (FIG. 3) is disposed at the standby position of the hopper 25 in the stacker 15. The hopper position detector 32 is a transmissive photosensor in this embodiment, and detects if the hopper 25 is in the standby position.

A MICR (magnetic ink character recognition) head 35 that contacts the face 4a of the check 4 and magnetically reads the MICR line 4c (FIG. 1) is disposed downstream from the ASF roller set 29. A MICR roller 36 is disposed opposite the MICR head 35. The MICR roller 36 is pushed to the MICR head 35 side, rotates while pressing the check 4 against the MICR head 35, and conveys checks 4 at a constant speed suited to reading the MICR line. An assist roller set 37 composed of a pair of rollers that guide the check 4 fed by the ASF roller set 29 to the MICR head 35 is disposed on the upstream side of the MICR head 35.

A paper length detector 38 is disposed to the conveyance path W between the assist roller set 37 and MICR head 35. The paper length detector 38 is a reflective photosensor in this embodiment, and detects the leading end and trailing end of each check 4 by detecting if a check 4 passing through the conveyance path W is at the detection position. The control unit 70 (control means) acquires the output signals of the paper length detector 38 and determines the length of the check 4 based on change in detector output.

A first conveyance roller set 40 including a pair of rollers disposed on opposite sides of the conveyance path W is disposed to the conveyance path W on the downstream side of the MICR head 35, and a second conveyance roller set 41 is disposed downstream from the first conveyance roller set 40. The first conveyance roller set 40 and second conveyance roller set 41 are driven rotationally by a conveyance motor 42 (FIG. 3), and these rollers convey the check 4 to the inkjet printer unit 44 (print unit).

The inkjet printer unit 44 has an inkjet head 10 (inkjet recording head). The inkjet head 10 is an inkjet recording head that is supplied with ink from an ink cartridge 45 (ink storage unit) installed in the front of the media processing device 1 and ejects ink onto the check 4. The inkjet head 10 in this embodiment prints an endorsement including text or symbols on the back 4b of the check 4.

An intermediate detector 46 is disposed between the inkjet head 10 and second conveyance roller set 41. The intermediate detector 46 is a reflective photosensor in this embodiment, and detects if a check 4 is at the detection position.

A CIS (contact image sensor) unit for optically reading checks 4 is disposed downstream from the inkjet head 10. This CIS unit includes a front CIS unit 47 (reading unit) for imaging the face 4a of the check 4, and a back CIS unit 48 (reading unit) for imaging the back 4b, and can thus optically image both sides of each check 4. The front CIS unit 47 and back CIS unit 48 are disposed on opposite sides of the conveyance path W. A first CIS roller 50 is disposed on the upstream side and a second CIS roller 51 is disposed on the downstream side of these units. The first CIS roller 50 and second CIS roller 51 are rollers that are driven rotationally by the conveyance motor 42, and checks 4 are conveyed by these rollers at a constant speed while being imaged by the CIS units.

A discharge detector 52 is located downstream from the second CIS roller 51. The discharge detector 52 is a reflective photosensor in this embodiment, and detects if a check 4 is at the detection position.

The exit pocket 19 described above is located downstream from the front CIS unit 47 and back CIS unit 48. The exit pocket 19 is divided into a main pocket 19a and a sub-pocket 19b, and the slot 18 splits and is connected to both the main pocket 19a and sub-pocket 19b. The main pocket 19a and sub-pocket 19b can each hold a plurality of checks 4.

A flapper 54 that switches the exit pocket 19 into which the check 4 is discharged to the main pocket 19a or sub-pocket 19b is disposed at the position where the slot 18 splits. The flapper 54 is a guide that by closing the path to the main pocket 19a or the path to the sub-pocket 19b guides the check 4 into the other pocket, and is driven by the flapper drive motor 55. A discharge roller 56 is disposed to the path from the flapper 54 to the main pocket 19a, another discharge roller 57 is disposed to the path from the flapper 54 to the sub-pocket 19b, and the checks 4 are thus smoothly discharged by these rollers and guided by the flapper 54 into the appropriate exit pocket 19.

As described below, the media processing device 1 discharges the check 4 into the main pocket 19a when the check 4 is determined to have been correctly loaded based on the result of the MICR head 35 reading the MICR line 4c, and into the sub-pocket 19b when the check 4 is determined to have not been correctly loaded.

As shown in FIG. 1 and FIG. 2, a thermal printer unit 60 for printing tickets with an image recorded thereon is provided in the middle of the media processing device 1.

A shown in FIG. 1, the thermal printer unit 60 has a printer cover 61 covering the top of the media processing device 1. This printer cover 61 is attached to the cover 12 so that the printer cover 61 can open and close freely. When the printer cover 61 is open, a roll paper compartment 62, which is a space for holding thermal roll paper, is exposed and the thermal roll paper can be installed or replaced. A paper exit 63 is formed in the printer cover 61, and the thermal roll paper held in the roll paper compartment 62 can be discharged through the paper exit 63.

The thermal printer unit 60 includes a roller platen (not shown in the figure) that supplies and feeds thermal roll paper from the roll paper compartment 62 through the conveyance path W, a thermal head 65 (FIG. 3) disposed opposite the platen, and a cutter unit 66 that cuts the thermal roll paper perpendicularly to the conveyance direction. To produce a ticket, the thermal printer unit 60 records an image on the thermal roll paper with the thermal head 65 while driving the platen and conveying the thermal roll paper in the conveyance direction, and then cuts the thermal roll paper at a specific position with the cutter unit 66 to produce a ticket.

Figure 3:
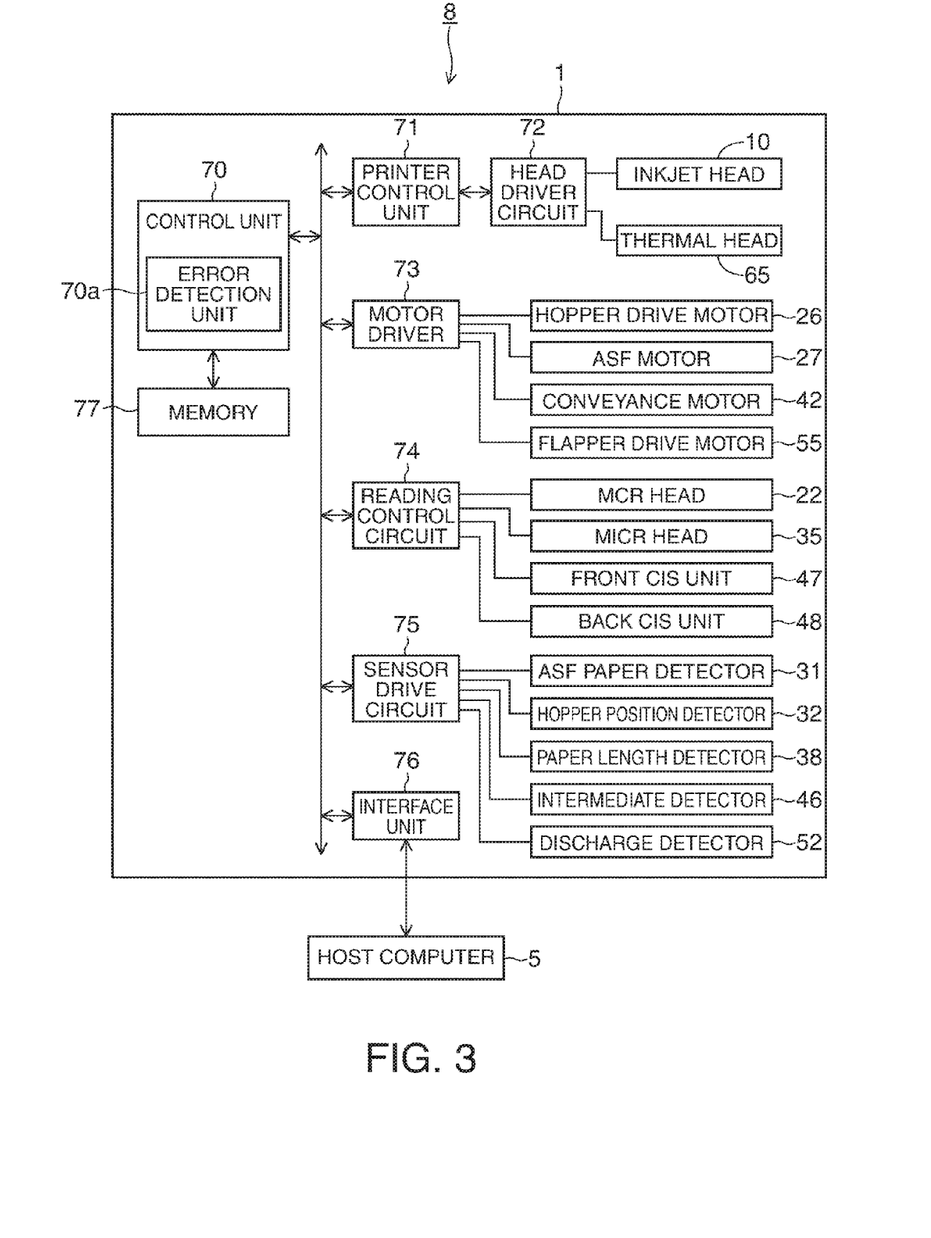
FIG. 3 is a block diagram of a media processing system.

FIG. 3 is a block diagram showing the functional configuration of a media processing system 8 composed of the media processing device 1 connected to a host computer 5 as an external device.

As shown in FIG. 3, the media processing device 1 has a control unit 70 including a CPU that controls media processing device 1 operation, RAM, and flash ROM; a printer control unit 71 that controls the inkjet printer unit 44 and thermal printer unit 60; and a head driver circuit 72, motor driver 73, reading control circuit 74, sensor drive circuit 75, and interface unit 76, which are connected so that they can communicate with each other.

The control unit 70 controls the other parts of the media processing device 1 by means of the CPU reading and running a control program stored in flash ROM. The control unit 70 also has RAM, which is memory for temporarily storing programs run by the CPU and process data. The control unit 70 also has memory 77 that temporarily stores data processed by the control unit 70. This memory 77 may be a memory device provided separately from or rendered using an area in the RAM of the control unit 70. The memory 77 has an area for temporarily storing control commands and print data received from the host computer 5, and space for writing the print image recorded by the control unit 70 on a check 4.

The printer control unit 71 supplies drive current to the inkjet head 10 (inkjet recording head) through the head driver circuit 72 to record on a check 4 as controlled by the control unit 70. The printer control unit 71 also supplies drive current to the thermal head 65 through the head driver circuit 72 to record on thermal roll paper as controlled by the control unit 70.

The motor driver 73 is connected to the hopper drive motor 26 and causes the hopper 25 to pivot as controlled by the control unit 70.

The motor driver 73 is connected to the ASF motor 27, conveyance motor 42, and flapper drive motor 55. The motor driver 73 outputs drive current and drive pulses to the motors. And operates the motors as controlled by the control unit 70.

The reading control circuit 74 is connected to the MCR head 22, MICR head 35, front CIS unit 47, and back CIS unit 48.

The reading control circuit 74 causes the MCR head 22 to read the magnetic information when a card is swiped through the card slot 21 (FIG. 1), and digitizes and outputs the read signal output from the MCR head 22 to the control unit 70 as controlled by the control unit 70.

The reading control circuit 74 also reads magnetic information with the MICR head 35, and digitizes and outputs the read signal output from the MICR head 35 to the control unit 70 as controlled by the control unit 70.

The reading control circuit 74 also images the face 4a and back 4b of the check 4 with the front CIS unit 47 and back CIS unit 48 as controlled by the control unit 70, and digitizes and outputs the signals output from the front CIS unit 47 and back CIS unit 48 to the control unit 70.

The sensor drive circuit 75 is connected to the ASF paper detector 31, hopper position detector 32, paper length detector 38, intermediate detector 46, and discharge detector 52, supplies current to these detectors, gets the output values therefrom at specific times, and digitizes and outputs the acquired detection signals to the control unit 70.

The interface unit 76 is connected to the host computer 5 by wire or wirelessly, and exchanges data, including control data, with the host computer 5 as controlled by the control unit 70.

The control unit 70 receives process control commands (commands to execute particular processes) sent from the host computer 5, and processes checks 4 accordingly Based on a command to process a check 4, the control unit 70 gets the output value from the ASF paper detector 31 through the sensor drive circuit 75, and detects if a check 4 is in the stacker 15. If a check 4 is loaded, the sensor drive circuit 75 gets the output value of the hopper position detector 32, checks if the hopper 25 is in the initial position, controls the motor driver 73 to operate the hopper drive motor 26 and ASF motor 27, and picks and feeds one check 4 into the conveyance path W.

The control unit 70 then controls the motor driver 73 and operates the conveyance motor 42 to drive the ASF roller set 29, MICR roller 36, assist roller set 37, first conveyance roller set 40, second conveyance roller set 41, first CIS roller 50, second CIS roller 51, and discharge rollers 56, 57 to convey the check 4.

The control unit 70 also controls the motor driver 73 and operates the flapper drive motor 55 to move the flapper 54 as needed to set the discharge destination of the check 4 after processing by the media processing device 1 is completed to the main pocket 19a or sub-pocket 19b, and discharges the check 4 with the appropriate discharge roller 56, 57. Note that the motors and rollers that convey the check 4 as controlled by the control unit 70 function here as a conveyance means (conveyance unit).

The control unit 70 controls the reading control circuit 74 to read with the MCR head 22 according to a command to read the MICR line 4c of the check 4, acquires and recognizes the magnetic waveform or data output from the MCR head 22, and outputs the recognition result to the host computer 5.

Based on a command for printing a check 4 and the print data sent with the print command, the control unit 70 also writes a print image of the text and images to be recorded in a print buffer in memory 77. The control unit 70 also controls the printer control unit 71 to print the text and images in the print image on the face 4a or back 4b of the check 4 with the inkjet head 10.

The control unit 70 also scans the face 4a and back 4b of the check 4 with the front CIS unit 47 and back CIS unit 48 according to a command to optically scan the check 4, and outputs the image data captured from the face 4a and back 4b of the check 4 to the host computer 5.

Based on a command to print on thermal roll paper and the print data sent with the command, the control unit 70 also writes a print image of the text and images to be recorded in a print buffer in memory 77. The control unit 70 then controls the printer control unit 71 and motor driver 73, prints the text and images in the buffered print image to thermal roll paper with the thermal head 65, discharges the thermal roll paper after printing from the paper exit 63, and cuts the paper with the cutter unit 66.

The media processing device 1 thus controls plural processing units (the MICR head 35, inkjet printer unit 44, front CIS unit 47 and back CIS unit 48, and thermal head 65) with the control unit 70, and processes checks 4 with an MICR function, printing function, optical reader function, and thermal roll paper printing function according to commands sent from the host computer 5. The media processing device 1 can use plural functions together in series, and can also use functions individually.

Figure 4:
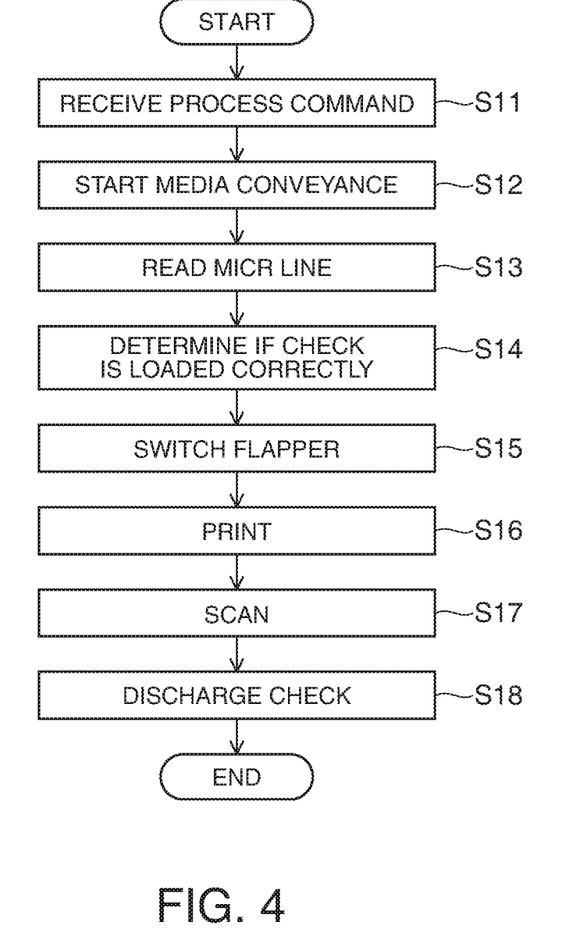
FIG. 4 is a flow chart of the operation of the media processing device.

FIG. 4 is a flow chart of operation when applying plural functions in series to a single check 4.

In the operation shown in FIG. 4, the MICR function, printing function, and optical reader (scanning) function are used in a single sequence.

When a command to start processing a check 4 is received from the host computer 5 (step S11), the control unit 70 of the media processing device 1 drives the hopper drive motor 26 and ASF motor 27 and feeds a check 4 into the conveyance path W, and starts check 4 conveyance (step S12).

Next, the control unit 70 reads the MICR line 4c of the check 4 with the MICR head 35 while managing the position of the check 4 by monitoring the output from the paper length detector 38 (step S13).

Based on the output from the MICR head 35, the control unit 70 determines if the check 4 was loaded correctly instead of backwards top-bottom or front-back (step S14), based thereon determines whether to discharge the check 4 into the main pocket 19a or sub-pocket 19b, and drives the flapper drive motor 55 to switch the flapper 54 as required (step S15). More specifically, if the check 4 was loaded correctly, the control unit 70 switches the flapper 54 to the main pocket 19a side, and if the check 4 was not loaded correctly, switches the flapper 54 to the sub-pocket 19b side.

Next, the control unit 70 conveys the check 4 while monitoring the position of the check 4 based on the output from the intermediate detector 46, and records a specific image on the back 4b of the check 4 with the inkjet head 10 (step S16).

The control unit 70 then scans the face 4a of the check 4 with the front CIS unit 47 while scanning the back 4b with the back CIS unit 48 (step S17), and outputs the scanned images to the host computer 5. Note that if the check 4 was not loaded correctly, scanning in step S17 may be skipped.

The control unit 70 then drives the conveyance motor 42 to discharge the check 4 into the appropriate exit pocket 19 while monitoring whether or not the check 4 was discharged correctly by monitoring the output of the discharge detector 52 (step S18), and the process ends. Note that steps S14 and S15 could run parallel to steps S16 to S18.

The control unit 70 also performs the function of an error detection unit 70*a* (FIG. 3) by running a control program stored in flash ROM. The error detection unit 70*a* detects error factors in the media processing device 1 based on the output states of detectors detected through the sensor drive circuit 75, and determines if an error occurred or not from the content of the error factors. When an error is determined to have occurred, the error detection unit 70*a* stops all operation of the media processing device 1 and reports the error to the host computer 5.

The main error factors detected by the error detection unit 70*a* are described next. When a cover open detector (not shown in the figure) detects that the cover 12 or printer cover 61 is open (open cover), and the hopper position detector 32 detects that the hopper 25 is not in the initial position when operation starts, are examples of general errors related to the media processing device 1.

Errors related to a check 4 include no check 4 in the stacker 15 after a command is received, and check 4 conveyance jams. A check 4 is determined to be jammed when, for example, the leading end or trailing end of the check 4 is not detected by the paper length detector 38 even though the check 4 conveyance distance exceeds a specific threshold, or detecting the leading end or trailing end of the check 4 by the intermediate detector 46 or discharge detector 52 takes too long relative to the conveyance distance.

Errors related to the inkjet printer unit 44 include the ink cartridge 45 being out of ink, the storage capacity of the waste ink tank that holds ink discharged by inkjet head 10 cleaning or flushing operations being exceeded, the number of defective nozzles detected by the inkjet head 10 nozzle check exceeding the threshold, and an abnormal temperature detected in the inkjet head 10.

Errors related to other processing units include an abnormal temperature in the thermal head 65, buffer errors when storing the image data from the front CIS unit 47 and back CIS unit 48 in memory 77, and running out of paper in the roll paper compartment 62.

Of these errors, no ink in the ink cartridge 45, an abnormal temperature in the inkjet head 10, a full waste ink tank, an abnormal temperature in the thermal head 65, a check 4 jam, and buffer errors require prompt correction of the problem in order to prevent damage, or require resolving the error and repeating the process, and are therefore considered urgent errors.

Other errors, such as no paper in the roll paper compartment 62, detecting a defective nozzle in the inkjet head 10, and open cover errors, are unlikely to lead to irreversible damage if unaddressed, and are therefore considered non-urgent errors.

When an error occurs, error detection unit 70*a* of the media processing device 1 goes to a mode in which commands from the host computer 5 cannot be received, or commands cannot be executed (that is, a busy or off-line state). After entering the busy or off-line mode, the error detection unit 70*a* monitors if the cause of the error was resolved, and could automatically return on-line when the error is resolved.

Because the media processing device 1 can also execute processes individually by the respective processing units (MICR head 35, inkjet printer unit 44, front CIS unit 47 and back CIS unit 48, and thermal head 65), the media processing device 1 can also be used without, for example, ever printing with the inkjet printer unit 44. If the inkjet head 10 is never used after purchasing the media processing device 1, for example, and only the reading functions of the MICR head 35 or front CIS unit 47 and back CIS unit 48 are used, there is no need to use ink for printing.

However, the media processing device 1 must maintain the nozzles of the inkjet head 10. Maintenance of the inkjet head 10 includes, for example, regular flushing, wiping, and cleaning. Flushing is a function that ejects a small amount of ink from all or some of the nozzles in the inkjet head 10 to remove ink that has increased in viscosity due to drying and prevent nozzle clogging. Wiping is an operation that maintains a desirable ink meniscus in the nozzles by wiping the nozzle face with a wiper (not shown in the figure) disposed opposite the nozzle face of the inkjet head 10, and a small amount of ink is consumed because the wiper wipes away ink. Cleaning is a function that applies negative pressure to an ink suction line inside a cap (not shown in the figure) that covers the nozzle face of the inkjet head 10 and suctions ink from inside the nozzles so that fresh ink flows into the nozzles and the ink supply path from the ink cartridge 45 to the nozzles to unclog the nozzles and clean the ink supply path. Because these maintenance operations require ink and must be performed even if the printing function of the inkjet head 10 is never used, the ink cartridge 45 must be recharged with ink as needed.

As a result, if the ink cartridge becomes empty, or the ink cartridge is not installed, the error detection unit in a media processing device according to the related art reports an error whether or not the user uses the printing function of the inkjet head. When an error is reported, the media processing device goes off-line and other functions also cannot be used.

The media processing device 1 according to this embodiment of the invention therefore has a normal mode in which all functions of the plural function units are enabled, including the MICR function, printing function, optical reader function, and thermal roll paper printing function, and a disabled mode (function-disabled mode) in which using one or more of these functions is disabled. Because a subset of the functions is disabled in the disabled mode, those disabled functions are not executed even if commands related to the disabled functions are received from the host computer 5. The error detection unit 70*a* also does not detect errors related to the disabled functions in the disabled mode, errors related to the disabled functions are not detected and the media processing device 1 does not go off-line.

A disabled mode can be provided for each of the functions of the media processing device 1, but for simplicity this embodiment describes only a printing-disabled mode that disables printing with the inkjet head 10.

Figure 5:
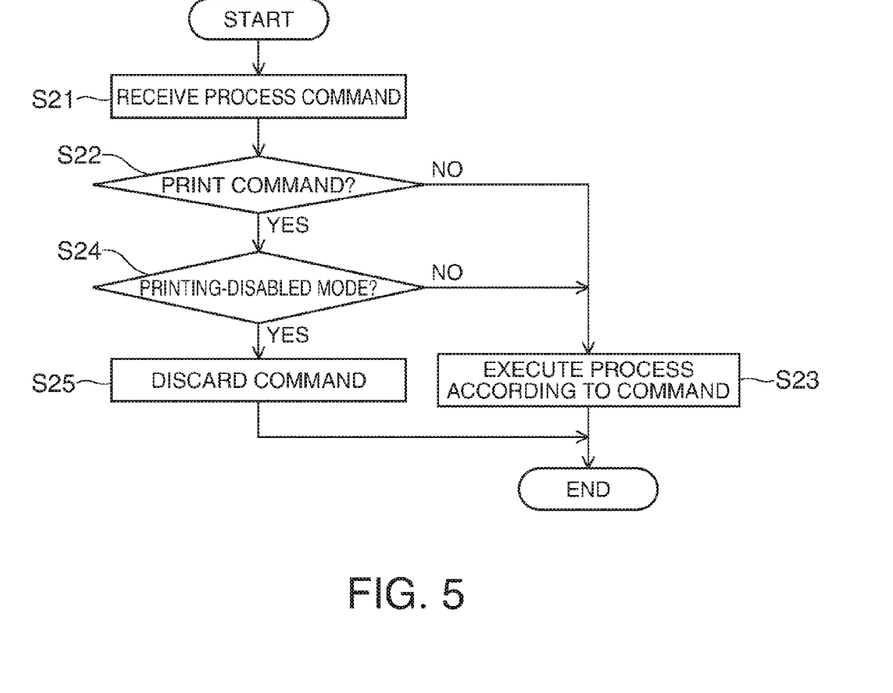
FIG. 5 is a flow chart of the operation of the media processing device.

FIG. 5 is a flow chart of the operation of the media processing device 1, and describes operation until the process starts when a process command is received from the host computer 5.

When a process command sent from the host computer 5 is received (step S21), the control unit 70 determines if the received command is a print command that invokes the printing function (step S22). If the received command is not a print command (step S22 returns No), the control unit 70 executes the process called by the received command (step S23).

If the received command is a print command (step S22 returns Yes), the control unit 70 determines if the current operating mode is the printing-disabled mode (step S24), and goes to step S23 and runs the process called by the print command if the current operating mode is not the printing-disabled mode (step S24 returns No). If the current operating mode is the printing-disabled mode (step S24 returns Yes), the received command is discarded (step S25), and the process ends. Note that when the received command is discarded, a status report indicating that the printing function will not be executed can be sent to the host computer 5.

When in the printing-disabled mode and an error related to the printing function occurs, the error detection unit 70a does not detect the error even if the cause of the error is related to the inkjet head 10.

Figure 6:
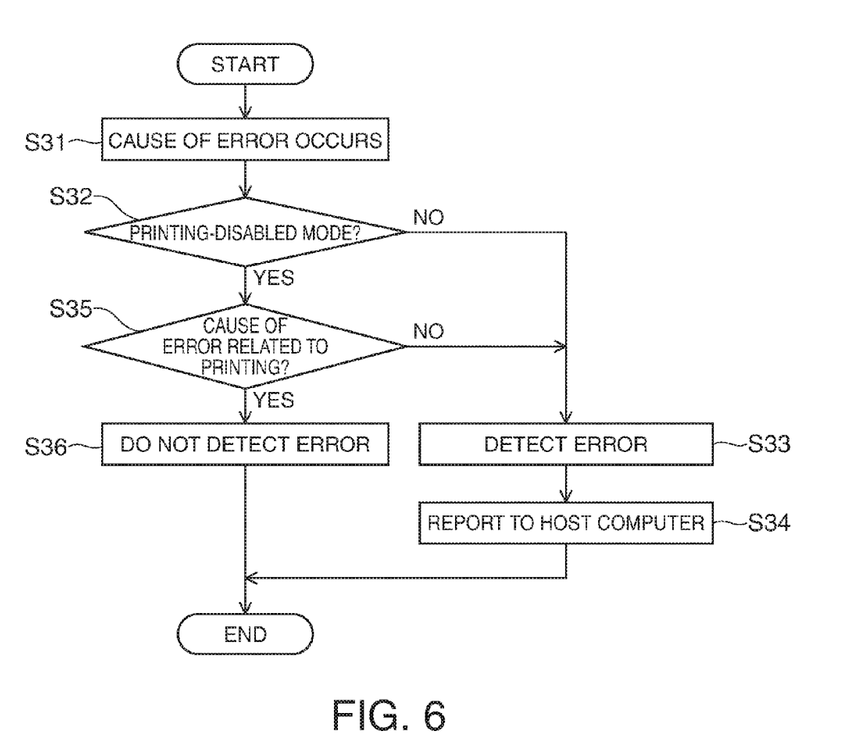
FIG. 6 is a flow chart of the operation of the media processing device.

FIG. 6 is a flow chart of the operation of the media processing device 1, and shows particularly the error detection operation of the error detection unit 70a.

If the error detection unit 70a receives the values or states detected by the detectors through the sensor drive circuit 75 and determines that an error occurred (step S31), the error detection unit 70a determines if the current operating mode is the printing-disabled mode (step S32). If the operating mode is not the printing-disabled mode (step S32 returns No), the error detection unit 70a determines that an error occurred based on the detected error factor (step S33), reports the error to the host computer 5 and goes off-line (step S34), and ends the process. When the cause of the error is then resolved and an operation for returning from the off-line state is performed, operation returns to the on-line state.

If the current operating mode is the printing-disabled mode (step S32 returns Yes), the error detection unit 70a determines if the error factor that occurred is related to the printing function (step S35). If the error factor was not related to printing (step S35 returns No), the error detection unit 70a goes to step S33 and detects the error. However, if the detected error factor was related to the printing function (step S35 returns Yes), the error detection unit 70a ends the process without detecting the error.

Because the printing function is not executed when a command that invokes the printing function is received and the error is not detected when an error factor related to the printing function occurs in the printing-disabled mode, the control unit 70 does not go off-line when inkjet printer unit 44 maintenance is not performed, and functions other than the printing function can still be used. Maintenance related to functions that are not used can therefore be omitted. Furthermore, because errors are detected unless the cause of the error is related to a disabled function, errors related to functions that are not disabled can be detected as in the normal operating mode. Accordingly, problems such as equipment failures and damage can be prevented. Because the inkjet printer unit 44 is not driven in the printing-disabled mode, not performing maintenance will not result in equipment failure.

Switching from the normal printing mode to the printing-disabled mode can be controlled by a command sent from the host computer 5 to the media processing device 1.

Figure 7A:
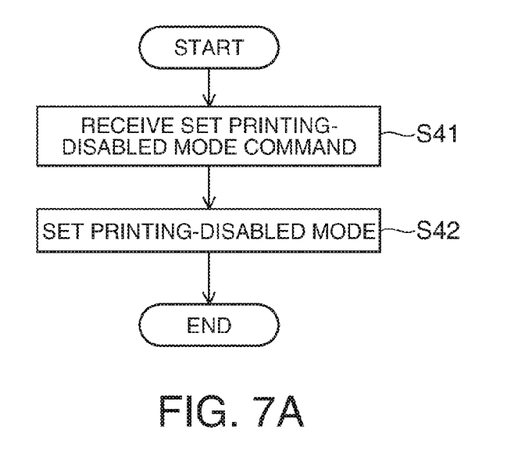
FIG. 7A is a flow chart of the operation of the media processing device.
Figure 7B:
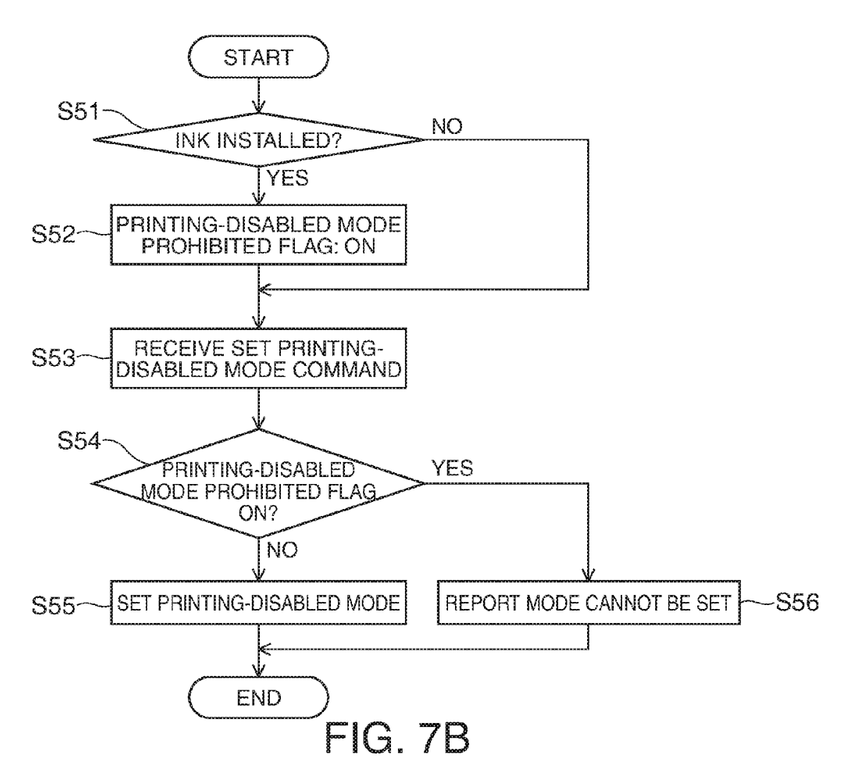
FIG. 7B is a flow chart of the operation of the media processing device.

FIG. 7A and FIG. 7B are flow charts of the operation of the media processing device 1, and more particularly show the operation related to setting the printing-disabled mode. FIG. 7A shows the operation related to setting the printing-disabled mode during normal operation, and FIG. 7B shows setting the printing-disabled mode in special cases.

As shown in FIG. 7A, when a command to set the printing-disabled mode is received from the host computer 5 (step S41), the control unit 70 sets the operating mode of the media processing device 1 to the printing-disabled mode according to the command (step S42). To end the printing-disabled mode and return to the normal operating mode, the host computer 5 sends a printing-disabled mode cancellation command, and the control unit 70 of the media processing device 1 receives the printing-disabled mode cancellation command and changes the operating mode to the normal mode.

Maintenance of the inkjet head 10 by means of flushing, wiping, or cleaning as described above, for example, is therefore essential, but if an ink cartridge 45 has never been installed in the media processing device 1, there is no danger of ink drying or clogging, and related maintenance is not necessary. A problem will therefore not result from not performing maintenance operations that consume ink if an ink cartridge 45 has not been installed. In other words, all maintenance operations, including replenishing the ink cartridge 45, can be skipped and all error factors related to the printing function, including there being no ink, can be ignored when in the printing-disabled mode, but this is only possible if an ink cartridge 45 has never been installed.

The media processing device 1 can therefore be configured to enable setting the printing-disabled mode only if an ink cartridge 45 has never been installed.

As shown in FIG. 7B, the control unit 70 monitors installation of an ink cartridge 45 after the media processing device 1 power first turns on (step S51), and if an ink cartridge 45 is installed (step S51 returns Yes) turns the printing-disabled mode prohibited flag ON (step S52). This printing-disabled mode prohibited flag is stored in flash ROM in the control unit 70, for example.

If an ink cartridge 45 is not installed (step S51 returns No), step S52 is skipped. After an ink cartridge 45 is installed and the printing-disabled mode prohibited flag is turned ON in step S52, steps S51 and S52 are skipped.

When a set printing-disabled mode command is received from the host computer 5 (step S53), the control unit 70 reads the printing-disabled mode prohibited flag (step S54), and if the printing-disabled mode prohibited flag is OFF (step S54 returns No), changes the operating mode of the media processing device 1 to the printing-disabled mode (step S55). However, if the printing-disabled mode prohibited flag is ON (step S54 returns Yes), the control unit 70 reports that the printing-disabled mode cannot be set to the host computer 5 (step S56), and ends the process in the normal operating mode. The operation of steps S53 to S56 repeats on a regular cycle while the media processing device 1 power is on.

In the operation shown in FIG. 5 and described above, the media processing device 1 discards the command when the received command invokes a printing function, but the command could be executed if the command relates to maintenance of the inkjet printer unit 44 in step S22 in FIG. 5. This enables keeping the inkjet printer unit 44 in a usable state by performing the maintenance operation on the inkjet printer unit 44 when a command related to maintenance of the inkjet printer unit 44 is sent from the host computer 5.

A configuration that detects errors related to the printing function that are urgent errors, such as no ink in the ink cartridge 45, an abnormal temperature in the inkjet head 10, a full waste ink tank, an abnormal temperature in the thermal head 65, a check 4 jam, and buffer errors, in step S35 in FIG. 6 is also conceivable. Because only the causes of errors that could lead to irreversible damage to the media processing device 1 if left unattended are reported in this case, monitoring can be limited to the minimum required for the disabled function. By limiting error detection to errors that are considered urgent, the maintenance for the inkjet printer unit 44 can be reduced compared with operation in the normal mode. This is particularly effective for users that do not use the printing function.

Of the functions related to the inkjet printer unit 44, execution of functions in the printing-disabled mode could be limited to functions related to inkjet printer unit 44 maintenance. The functions related to maintenance of the inkjet printer unit 44 can also be limited to a minimal set of functions. As described above, inkjet printer unit 44 maintenance normally includes flushing, wiping, and cleaning, and flushing is performed at a specific time interval (such as several seconds) while the cap (not shown in the figure) is removed from the nozzle face of the inkjet head 10. Wiping is performed after removing the cap before starting printing every time a print job starts or each time after a specific number of print jobs. Cleaning is performed whenever the printing time exceeds a specific threshold, or whenever a specific period of time passes with the media processing device 1 power on. The interval (the specific times described above) at which these flushing, wiping, and cleaning operations are performed can be preset for each function and stored in the flash ROM of the control unit 70.

A configuration that stores at least two different intervals for flushing, wiping, and cleaning, that is, an interval for the normal mode and an interval for the printing-disabled mode, and changes the intervals for flushing, wiping, and cleaning when the printing-disabled mode is set by the operation shown in FIG. 7A, is also conceivable. When the printing-disabled mode is set after an ink cartridge 45 has been installed once, this configuration enables maintaining the inkjet printer unit 44 in a usable state, minimizes ink consumption and the time waiting for maintenance operations, and can greatly reduce the maintenance load compared with operation in the normal mode.

As described above, the media processing device 1 according to this embodiment of the invention has an inkjet printer unit 44 with a function for printing checks 4, and a front CIS unit 47 and back CIS unit 48 with a function for scanning checks 4, disposed to the conveyance path W through which checks 4 are conveyed, and a control unit 70 that, when a command disabling the function of the inkjet printer unit 44 or the front CIS unit 47 and back CIS unit 48 (the printing function in this example) is received from the host computer 5, enters a printing-disabled mode that disables the function specified by the command (the printing function in this example), and when in the printing-disabled mode stops sending error reports to the host computer 5 for errors related to the disabled function.

As a result, a media processing device 1 with plural functions enables using only a subset of those functions, and enables continuing to use the media processing device 1 when an error related to a function that is not used is detected without doing anything to correct the error. When the printing function of the inkjet head 10 is not used, for example, this configuration reduces the need for maintenance related to the printing function.

The inkjet printer unit 44 has an inkjet head 10 that records by ejecting ink stored in an ink cartridge 45 onto a check 4, and errors related to the inkjet head 10 and supplying ink are not reported when the printing-disabled mode, which uses only the front CIS unit 47 and back CIS unit 48 and does not use the inkjet printer unit 44, is set. The front CIS unit 47 and back CIS unit 48 can therefore be used without performing any ink-related maintenance tasks, the maintenance load can be reduced, and ink consumption can be suppressed.

Furthermore, because the control unit 70 does not enter the printing-disabled mode when a set printing-disabled mode command is received after an ink cartridge 45 has once been installed and ink supply enabled, the maintenance load can be reduced when using functions other than the inkjet printer unit 44, and problems resulting from omitting required maintenance after supplying ink has been enabled can be prevented.

Further alternatively, after an ink cartridge 45 has once been installed and ink supply enabled, the control unit 70 can enter the function-disabled mode and enable maintenance of the inkjet printer unit 44 when a set printing-disabled mode command is received, and thereby prevent problems resulting from omitting required maintenance while also suppressing ink consumption.

Furthermore, of the error factors related to the printing function, errors related to urgent error factors are detected and reported to the host computer 5 in the printing-disabled mode, and other errors are ignored. Error detection related to the disabled function can therefore be suppressed and the maintenance load reduced while still appropriately reporting errors that cannot be ignored to the user.

The invention is described above with reference to a preferred embodiment of the invention, but the invention is not so limited. For example, the media processing device 1 is described in the foregoing embodiment as being able to switch between a printing-disabled mode that disables the printing function of the inkjet head 10, and a normal mode, but the invention is not so limited. More specifically, configurations that can select a mode disabling printing by the thermal head 65, or operating modes that disable other functions, and do not detect errors for error factors related to the disabled function, are also conceivable.

The causes of errors considered urgent and not-urgent above are also used as examples only, and the specific configuration of the media processing device 1 can be changed as desired.

The media processing device 1 is described above using as an example a configuration in which ink is supplied to the inkjet head 10 from a stationary ink cartridge 45, but the actual configuration of the inkjet printer unit 44 can be changed as desired, including configurations using on-carriage ink cartridges in devices in which the inkjet head 10 is mounted on a carriage and scans with the carriage.

The function units shown in the block diagram in FIG. 3 simply illustrate one functional configuration, the function units do not need to be rendered as discrete hardware devices, and the functions of plural function units can be combined in a single hardware device, or a single function unit can be rendered using plural hardware devices, through the cooperation of software and hardware.

The program run by the CPU of the control unit 70 that executes the operations described above is not limited to being stored in nonvolatile memory of the control unit 70, and may be stored on a removable recording medium, or stored downloadably on another device connected over a communication line, and the media processing device 1 could download and run the program from the other device. Other aspects of the configuration can also be changed as desired.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device comprising:
    a conveyance roller configured to convey media through a media path;
    a reader disposed at the media path configured to read the media conveyed through the media path, including a contact image sensor;
    a print mechanism disposed at the media path configured to print on the media conveyed through the media path, including an inkjet head configured to eject ink and an ink cartridge configured to store the ink;
    an ink cartridge holder in which the ink cartridge is installed; and
    a controller configured to control the conveyance roller, the reader, and the print mechanism, to determine whether an error occurs, and to monitor installation of the ink cartridge in the cartridge holder, wherein the media processing device has an operating mode that is changed based on a command received by an external device,
    wherein when the operating mode is a first mode wherein the media conveyed by the conveyance roller is read by the reader and is printed by the print mechanism, the controller is configured to report an error that the ink cartridge is not installed in the ink cartridge holder and/or an error related to the reader,
    wherein when the operating mode is a second mode wherein the media conveyed by the conveyance roller is read by the reader and is not printed by the print mechanism, the controller is configured to report the error related to reader and does not report the error that the ink cartridge is not installed in the ink cartridge holder, and
    wherein when the ink cartridge is installed in the ink cartridge holder and the ink supplied to the inkjet head, the controller ignores the command which changes the operating mode to the second mode, and sets the operating mode to the first mode.

2. The media processing device described in claim 1, wherein the reader further comprises a magnetic ink character recognition.

3. The media processing device described in claim 1, wherein when the operating mode is in the first mode, the controller discharges the print command.

4. The media processing device described in claim 1, wherein the controller goes off-line after reporting the error to the external device.

5. A method of controlling a media processing device that includes a print unit disposed to a conveyance path and a reading unit disposed to the conveyance path, the print unit having a function that prints on a processed media, and a reading unit having a function that reads the processed media, the method comprising:
    receiving a command from an external device to operate the media processing device in an operating mode that is either a first mode or a second mode;
    when operating in a first mode, when an error is detected, reporting an error relating to the print unit and/or an error related to the reading unit;
    when operating in a second mode:
        disabling at least one of the function of the print unit;
        when an error related to the disabled function of the print unit, not reporting the error relating to the print unit to the external device, and
        executing specific maintenance operations related to the print unit,
    wherein the print unit includes an inkjet recording head that records by ejecting ink stored in an ink storage unit onto the processed media, and when a command to disable the function of the print unit is received after the ink storage unit is enabled to supply ink, the command being based on ink levels, toner levels, or ink cartridge presence, the command is ignored, whereby the second mode is not entered and the media processing device is set to operate in the first mode.

6. The method of claim 5, wherein when operating in a second mode, when an error related to the reading unit, reporting the error relating to the reading unit to the external device.

7. The method of claim 5, wherein the error related to the print unit is an indication that that an ink cartridge is not installed in the ink cartridge holder.

8. The method of claim 5, wherein the reading unit further comprises a magnetic ink character recognition configured for reading the processed media.

9. The method of claim 5, further comprising:
    entering the second mode and enabling executing specific maintenance operations related to the print unit when the command to disable the function of the print unit is received after the ink storage unit is enabled to supply ink.

10. The method of claim 5, wherein:
    a subset of errors related to the function disabled in the second mode are not reported, but other errors related to the disabled function are reported, to the external device.

11. The method of claim 5, further comprising:
    monitoring installation of the ink cartridge with a controller; and
    discharging a command to set the operating mode to the first mode if the ink cartridge is installed in the ink cartridge holder.

12. The method of claim 11, wherein when the operating mode is in the first mode, the controller discharges the print command.

13. The method of claim 5, wherein a controller goes off-line after reporting the error to the external device.

* * * * *